US012749039B2

(12) United States Patent
Place et al.

(10) Patent No.: US 12,749,039 B2
(45) **Date of Patent: *Sep. 29, 2026**

(54) INTELLIGENT LOAD CLUSTERS FOR FREIGHT

(71) Applicant: Uber Technologies, Inc., San Francisco, CA (US)

(72) Inventors: Michael Douglas Place, New York, NY (US); Ran Sun, Orinda, CA (US); Elizabeth Gabriella Oliva, Chicago, IL (US); Suchit Dubey, Castro Valley, CA (US); Yichen Wang, San Carlos, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,950

(22) Filed: Sep. 30, 2024

(65) Prior Publication Data

US 2025/0021921 A1 Jan. 16, 2025

Related U.S. Application Data

(63) Continuation of application No. 17/884,881, filed on Aug. 10, 2022, now Pat. No. 12,106,254.
(Continued)

(51) Int. Cl.
*G06Q 10/08* (2024.01)
*G06F 18/23* (2023.01)
*G06Q 50/40* (2024.01)

(52) U.S. Cl.
CPC ............ *G06Q 10/08* (2013.01); *G06F 18/23* (2023.01); *G06Q 50/40* (2024.01)

(58) Field of Classification Search
CPC ......... G06Q 10/08; G06Q 50/40; G06F 18/23
(Continued)

(56) References Cited

U.S. PATENT DOCUMENTS

2004/0249699 A1 12/2004 Laurent et al.
2009/0000505 A1 1/2009 Shimamura et al.
(Continued)

OTHER PUBLICATIONS

"Intelligent freight-transportation systems: Assessment and the contribution of operations research" Published by Elsevier (Year: 2009).*
(Continued)

*Primary Examiner* — Zeina Elchanti
(74) *Attorney, Agent, or Firm* — Dority & Manning, P.A

(57) ABSTRACT

A computer-implemented method includes accessing data descriptive of a plurality of freight lanes, each freight lane being associated with a pickup region and a dropoff region for one or more loads, wherein each of the plurality of freight lanes includes one or more lane attributes; determining that two or more freight lanes of the plurality of freight lanes satisfy at least one clustering criteria indicative of a similarity between the two or more freight lanes based at least in part on the one or more freight lane attributes; in response to determining that the two or more freight lanes meet the at least one clustering criteria, clustering the two or more freight lanes to generate a clustered freight lane including the two or more freight lanes; receiving a request from a carrier computing device to associate a carrier with the clustered freight lane; and assigning at least one load of the one or more loads associated with the two or more freight lanes including the clustered freight lane to the carrier based at least in part on the request from the carrier.

20 Claims, 7 Drawing Sheets

Related U.S. Application Data

(60) Provisional application No. 63/357,304, filed on Jun. 30, 2022.

(58) Field of Classification Search
USPC .......................................................... 705/333
See application file for complete search history.

(56) References Cited

U.S. PATENT DOCUMENTS

| | | | | |
|---|---|---|---|---|
| 2015/0248638 | A1* | 9/2015 | Hergarten ........ | G06Q 10/08345 705/335 |
| 2017/0344932 | A1* | 11/2017 | Ahmadi ............... | G06Q 10/083 |
| 2018/0240045 | A1 | 8/2018 | Zhang et al. | |
| 2019/0172010 | A1 | 6/2019 | Miller et al. | |
| 2019/0265059 | A1 | 8/2019 | Warnick et al. | |
| 2020/0364664 | A1 | 11/2020 | Chen et al. | |
| 2022/0076193 | A1 | 3/2022 | Chen et al. | |

OTHER PUBLICATIONS

Crainic, et al. "Intelligent freight-transportation systems: Assessment and the contribution of operations research" Published by Elsevier (Year: 2009).

International Search Report and Written Opinion for Application No. PCT/US2023/025951, mailed Oct. 17, 2023, 11 pages.

* cited by examiner

INTELLIGENT LOAD CLUSTERS FOR FREIGHT

CROSS-REFERENCE TO RELATED APPLICATIONS

This application claims priority to U.S. Non-Provisional application Ser. No. 17/884,881, filed on Aug. 10, 2022, which claims priority to U.S. Provisional Application Ser. No. 63/357,304, filed on Jun. 30, 2022, the entire contents of which are hereby incorporated by reference.

FIELD

The present disclosure relates generally to improved freight routing and loading.

BACKGROUND

Management of owner-operated freight vehicles can be complicated due to the complex nature of customer requirements and the need to convey information to the carriers operating the vehicles. Transport management systems provide various types of technological features for monitoring and tracking freight vehicles and performing other tasks related to the management of freight vehicles.

SUMMARY

Aspects and advantages of embodiments of the present disclosure will be set forth in part in the following description, or can be learned from the description, or can be learned through practice of the embodiments.

One example aspect of the present disclosure is directed to a computing system including one or more processors; and one or more non-transitory, computer-readable media storing instructions that are executable by the one or more processors to cause the computing system to perform operations including: accessing data descriptive of a plurality of freight lanes, each freight lane being associated with a pickup region and a dropoff region for one or more loads, wherein each of the plurality of freight lanes includes one or more lane attributes; determining that two or more freight lanes of the plurality of freight lanes satisfy at least one clustering criteria indicative of a similarity between the two or more freight lanes based at least in part on the one or more freight lane attributes of each of the two or more freight lanes; in response to determining that the two or more freight lanes meet the at least one clustering criteria, clustering the two or more freight lanes to generate a clustered freight lane including the two or more freight lanes, wherein clustering the two or more freight lanes to generate a clustered freight lane includes storing data descriptive of the clustered freight lane; receiving, over one or more networks, a request from a carrier computing device to associate a carrier with the clustered freight lane; and assigning at least one load of the one or more loads associated with the two or more freight lanes including the clustered freight lane to the carrier based at least in part on the request from the carrier.

In some implementations, each of the plurality of freight lanes is associated with a customer or shipper (e.g., a person or entity who needs a load to be moved by a carrier) and the clustered freight lane is associated with one or more customers.

In some implementations, the clustered freight lane is associated with a hierarchical priority order of a plurality of carriers. For instance, a cluster can be associated with (e.g., assigned to) at least one of a primary carrier or a secondary carrier, wherein the primary carrier is assigned the at least one load prior to the secondary carrier.

In some implementations, the operations further include, in response to assigning the at least one load of the one or more loads to the carrier, receiving a tender acceptance response from the carrier accepting or rejecting the at least one load.

In some implementations, clustering the two or more freight lanes to generate a clustered freight lane includes determining a geographical definition associated with the clustered freight lane, the geographical definition associated with at least one of a pickup region or a dropoff region associated with the clustered freight lane.

In some implementations, clustering the two or more freight lanes to generate a clustered freight lane includes determining a rate associated with the clustered freight lane, wherein the rate is based at least in part on the one or more lane attributes associated with the two or more freight lanes.

In some implementations, determining a rate associated with the clustered freight lane includes determining a single rate associated with all loads in the clustered freight lane.

In some implementations, determining a rate associated with the clustered freight lane includes determining a base rate associated with the clustered freight lane, and wherein rates associated with each load in the clustered freight lane are determined based at least in part on the base rate.

In some implementations, the one or more freight lane attributes include one or more of equipment type, loading type, geography, load weight, commodity type, special requirements, customer type, or rate.

In some implementations, the data descriptive of the plurality of freight lanes and the clustered freight lane are updated at regular intervals.

In some implementations, the at least one clustering criteria includes one or more of a load volume criteria, a freight lane radius criteria, a pickup radius criteria, a dropoff radius criteria, an equipment type criteria, an average mileage criteria, a weight criteria, a potential routes criteria, a potential commodities criteria, a pickup schedule criteria, a dropoff schedule criteria, an average rate criteria, a reservation criteria, a freight lane status criteria, or bid criteria.

In some implementations, assigning the at least one load includes: receiving carrier preferences from the carrier associated with the clustered freight lane; determining that the load attributes of the at least one load satisfy at least some of the carrier preferences; and, in response to determining that the load attributes of the at least one load satisfy at least some of the carrier preferences, assigning the at least one load to the carrier.

In some implementations, the carrier preferences can include one or more of pickup day, pickup time, dropoff day, dropoff time, lead time, maximum capacity, equipment type, loading type, geography, average load weight, commodity type, special requirements, customer type, or rate.

In some implementations, assigning the at least one load of the one or more loads to the carrier includes automatically assigning the at least one load, wherein the carrier is given an opportunity to reject the at least one load within a time duration and the at least one load is accepted otherwise.

Another example aspect of the present disclosure is directed to a computer-implemented method including: accessing, by a computing system including one or more computing devices, data descriptive of a plurality of freight lanes, each freight lane being associated with a pickup region and a dropoff region for one or more loads, wherein each of the plurality of freight lanes includes one or more lane attributes; determining, by the computing system, that two or more freight lanes of the plurality of freight lanes satisfy at least one clustering criteria indicative of a similarity between the two or more freight lanes based at least in part on the one or more freight lane attributes of each of the two or more freight lanes; in response to determining that the two or more freight lanes meet the at least one clustering criteria, clustering, by the computing system, the two or more freight lanes to generate a clustered freight lane including the two or more freight lanes; receiving, by the computing system, a request from a carrier computing device to associate a carrier with the clustered freight lane; and assigning at least one load of the one or more loads associated with the two or more freight lanes including the clustered freight lane to the carrier based at least in part on the request from the carrier.

In some implementations, clustering the two or more freight lanes to generate a clustered freight lane includes determining a geographical definition associated with the clustered freight lane, the geographical definition associated with at least one of a pickup region or a dropoff region associated with the clustered freight lane.

In some implementations, clustering the two or more freight lanes to generate a clustered freight lane includes determining a rate associated with the clustered freight lane, wherein the rate is based at least in part on the one or more lane attributes associated with the two or more freight lanes.

In some implementations, the one or more lane attributes include one or more of equipment type, loading type, geography, load weight, commodity type, special requirements, customer type, or rate.

In some implementations, the at least one clustering criteria includes one or more of a load volume criteria, a freight lane radius criteria, a pickup radius criteria, a dropoff radius criteria, an equipment type criteria, an average mileage criteria, a weight criteria, a potential routes criteria, a potential commodities criteria, a pickup schedule criteria, a dropoff schedule criteria, an average rate criteria, a reservation criteria, a freight lane status criteria, or bid criteria.

Yet another example aspect of the present disclosure is directed to one or more non-transitory, computer-readable media storing instructions including: accessing data descriptive of a plurality of freight lanes, each freight lane being associated with a pickup region and a dropoff region for one or more loads, wherein each of the plurality of freight lanes includes one or more lane attributes; determining that two or more freight lanes of the plurality of freight lanes satisfy at least one clustering criteria indicative of a similarity between the two or more freight lanes based at least in part on the one or more freight lane attributes of each of the two or more freight lanes; in response to determining that the two or more freight lanes meet the at least one clustering criteria, clustering the two or more freight lanes to generate a clustered freight lane including the two or more freight lanes; receiving, over one or more networks, a request from a carrier computing device to associate a carrier with the clustered freight lane; and assigning at least one load of the one or more loads associated with the two or more freight lanes including the clustered freight lane to the carrier based at least in part on the request from the carrier.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
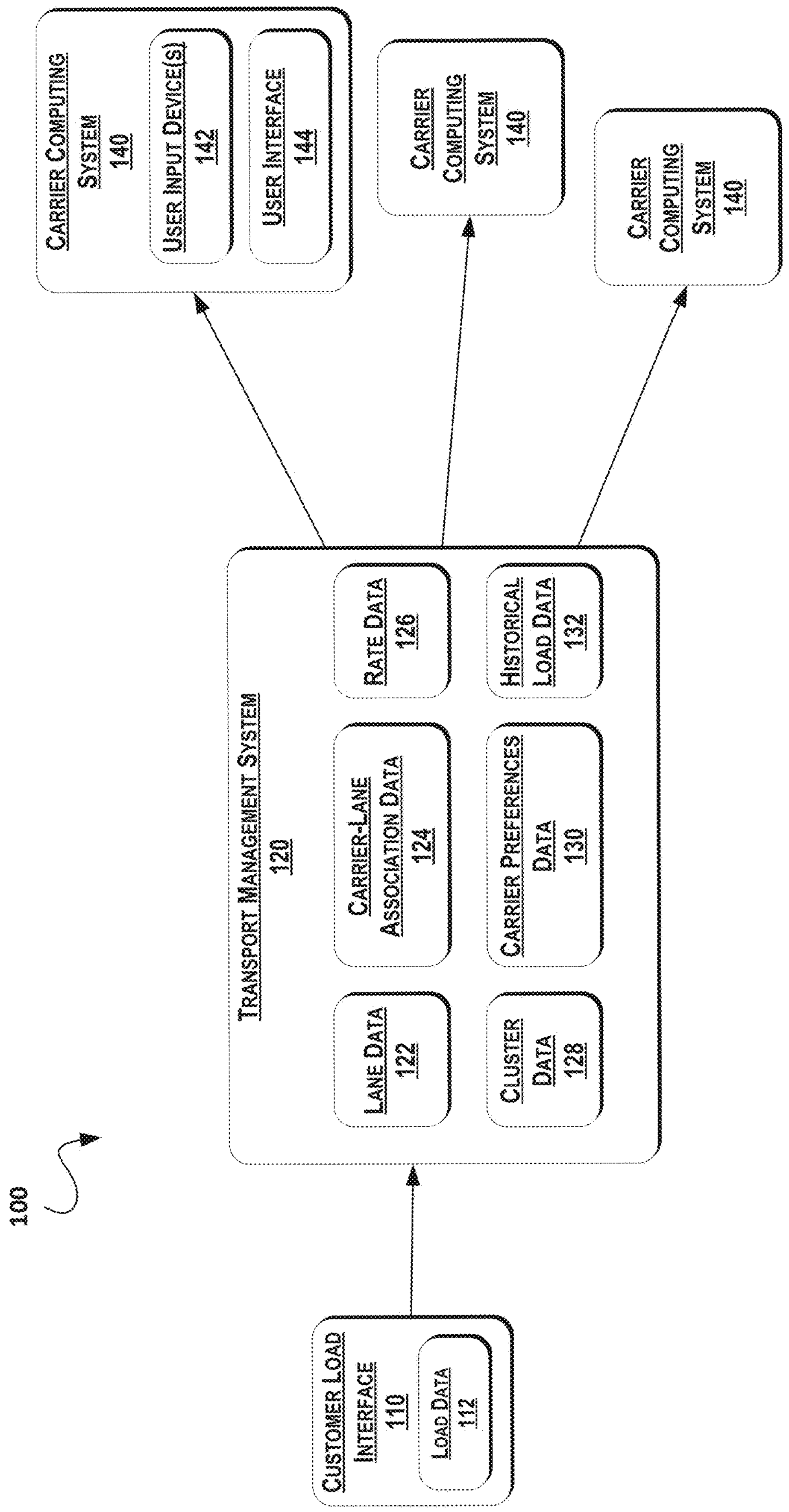
FIG. 1 depicts a block diagram of an example system for assigning loads to a carrier based at least in part on a clustered freight lane according to example embodiments of the present disclosure.

Generally, the present disclosure is directed to improvements in intelligent load clusters for freight. For instance, a transport management system can assign or tender loads from customers to one or more carriers (e.g., truck drivers, companies managing truck drivers and/or fleets of trucks, etc.) for delivery in return for a rate or cost associated with the load. To encourage consistency, carriers can be offered consistent freight or loads along one or more freight lanes, also referred to as trucking freight lanes or shipping freight lanes, from a pickup region to a dropoff region in return for an upfront rate per load, fixed for some or all loads associated with the freight lane. The freight lanes can also connect multiple points or locations in any shape or direction and connect multiple cities and/or transport hubs. The freight lanes may define pickup location and dropoff location and, in some implementations, the freight lanes may also define intermediate locations. For instance, in some cases, the freight lanes may define exact routes by road segments, points along a map, etc. In particular, the freight lanes can define semi-regular loads that are associated with a given customer, generally from a consistent pickup location to a consistent dropoff location (e.g., from a first city to a second city). A carrier can be associated with the freight lane such that the carrier is assigned loads on the freight lane, while generally having the opportunity to accept or reject individual loads. This approach can be beneficial for carriers, customers, and service operators alike because the consistency and upfront rate can provide numerous benefits for budgeting, scheduling, and/or other aspects of load transportation.

However, some freight lanes may not always have consistent freight which can be detrimental to the carriers' experience. For example, some freight lanes may have irregular bouts of freight, which can lead carriers to not desire the freight lane, especially if the freight lane is in a location where carriers are unlikely to already be from prior loads (e.g., a remote or unusual city, county, etc.). As another example, some freight lanes may have inconsistent attributes of their freight lanes, such as some loads requiring specialized equipment or loading techniques. These inconsistencies can lead carriers to reject loads on the freight lane. It would be beneficial to improve desirability of loads on freight lanes by improving consistency, which would ultimately improve the experience of carriers and customers alike.

According to example aspects of the present disclosure, a system can cluster one or more freight lanes having some degree of similarity (e.g., at least one same or compatible lane attribute, pickup locations and/or dropoff locations each being within a threshold distance of each other, etc.) to produce a clustered freight lane. The freight lanes combined into a clustered freight lane can be treated as a single freight lane in that carriers can associate themselves with the clustered freight lane as they would an ordinary freight lane and/or will be assigned shipments from each freight lane in the clustered freight lane. The clustered freight lane can be associated with a pickup region and/or a dropoff region shared by some or all of the freight lanes that are combined into the clustered freight lane. Additionally and/or alternatively, the clustered freight lane can define a radius around the region(s) such that freight lanes within the radius can be included in the clustered freight lane. Additionally and/or alternatively, the system can determine rate(s) associated with loads in the clustered freight lane to provide an upfront, consistent cost associated with the loads. In this way, several (e.g., potentially less desirable) freight lanes can be clustered into a single clustered freight lane, potentially increasing desirability of the clustered freight lane and therefore improving efficiency of the load assigning service.

For example, a transport management system that is implemented on one or more computing systems (e.g., one or more server computing systems) can store (e.g., in a data store, such as a data store including one or more computer-readable media) data descriptive of freight langes. The data descriptive of freight lanes can include two or more freight lanes having a relatively close pickup region and dropoff region, such as pickup regions that are within a certain radius of a central point and/or dropoff regions that are within a certain radius of a central point. The freight lanes may each be associated with a different customer (e.g., shipper, shipment source, etc.), type of goods, and/or other load attributes. The transport management system can process the freight lanes to determine whether any of the two or more freight lanes are viable candidates for inclusion in a clustered freight lane. For example, the transport management system can compare the freight lanes attributes of the freight lanes to determine whether the freight lanes have compatible goods types, sufficiently close pickup locations and dropoff locations, similar or same equipment types required for transit, and/or other determinations that are indicative of whether the freight lanes are viable for clustering. The clustered freight lane can be determined based at least in part on a geographical definition associated with the clustered freight lane, where the geographical definition is associated with at least one of a pickup region or a dropoff region associated with the clustered freight lane. For instance, if the freight lanes in the clustered freight lane are associated with a pickup region such as, for example, a city name or warehouse name, the clustered freight name may also be associated with that city name or warehouse name. Additionally and/or alternatively, the transport management system can determine (e.g., based on historical data about load volume) whether the available volume of loads on the freight lanes is inconsistent and/or low enough such that the clustered freight lane would provide improved consistency over the individual freight lanes. As one example, if the freight lanes are determined to have load volumes that are inconsistent enough and/or low enough such that the clustered freight lane would be beneficial, have sufficiently close pickup and dropoff locations, and/or are not determined to have any conflicts in other lane attributes (e.g., goods types that would contaminate a trailer or its contents, goods that require a specialized type of trailer or loading, etc.), then the freight lanes could be clustered into a clustered freight lane.

In particular, according to aspects of the present disclosure, a computing system (e.g., a load assigning system) can perform operations directed to generating clustered freight lanes and/or assigning loads on the clustered freight lanes to one or more carriers. The computing system can include one or more processors and/or one or more non-transitory, computer-readable media storing instructions that are executable by the one or more processors to cause the computing system to perform operations for implementing systems and methods described herein.

The system can access data descriptive of a plurality of freight lanes, each freight lane being associated with a pickup region and a dropoff region for one or more loads. The freight lanes can describe shipping patterns, such as regular or semi-regular shipping patterns, associated with a given customer. As one example, a freight lane may describe a semi-regular shipping pattern between a customer's manufacturing plant and distribution center, between the distribution center and distribution centers in other cities, or some other regularly-serviced route. The customer may regularly send shipments or loads between the distribution center and manufacturing plant (e.g., shipments of raw materials and/or finished goods) based on, for example, a manufacturing schedule, a certain volume of available goods, or other considerations. Example aspects of the present disclosure are discussed with reference to freight lanes having a pickup region and dropoff region for the purposes of illustration. It should be understood that freight lanes may have more than one pickup region and/or more than one dropoff region in accordance with example aspects of the present disclosure. It should also be understood that freight lanes may not necessarily have consistent loads. Loads can be provided along the freight lane. For instance, the customer may provide loads that conform to the freight lane.

The pickup region can describe a specific and/or generalized geographic region in which a load associated with the freight lane is first acquired by the carrier who is assigned to ship the load. Additionally and/or alternatively, the dropoff region can describe a specific and/or generalized geographic region in which the load is removed from the carrier's possession and/or the load is completed. The pickup region and/or dropoff region can be described with various degrees of specificity. For instance, in some implementations, the pickup region and/or dropoff region may describe coordinates/addresses, coordinates/addresses with a generalized radius, neighborhoods or districts, suburbs, cities, greater city areas, counties, states, countries, etc., and/or combinations thereof. Generally, a carrier will acquire the load at the pickup region, transport (e.g., by a carrier vehicle, such as a truck) the load to the dropoff region, then deliver the load at the dropoff region to a second party, such as another carrier, a customer, a manufacturer or distributor, etc.

The freight lane(s) can have one or more lane attributes respectively associated with the freight lane(s). For instance, the system can store data descriptive of the freight lane attribute(s) respectively associated with the freight lane(s). The freight lane attribute(s) can be stored in a data structure with the freight lane(s). The freight lane attribute(s) can describe attributes of a freight lane including, but not limited to, geographic attributes, shipping limitations or requirements, commodity types, and/or any other suitable attributes. Clustering decisions described herein may be made based on some or all of the lane attributes described herein. However, the example lane attributes described herein are intended to be illustrative and not limiting, and variations on which, if any, lane attributes are considered, by heuristic rules or otherwise, are contemplated as being within the scope of the present disclosure.

As one example, the freight lane attribute(s) can be or can include equipment type. The equipment type attribute can describe a type of equipment that is recommended and/or required to transport loads along the freight lane. For instance, the equipment type attribute can indicate that the freight lane requires flatbed trailers, vans, reefers or refrigerated trailers, livestock trailers, automobile trailers, wide-load trucks and/or trailers, and/or any other suitable equipment type restrictions or recommendations. For instance, in some implementations, it may be desirable to cluster freight lanes requiring different types of equipment separately. The freight lane attribute(s) can additionally and/or alternatively be or include special requirements, such as plated trailers, vented trailers, driver assist, etc. that may complicate loads on the freight lane. The freight lane attribute(s) can additionally and/or alternatively be or include loading type. The loading type attribute can describe a loading type required for the freight lane. For instance, the loading type attribute can indicate whether a live load or drop load is required. In some implementations, it may be desirable to cluster freight lanes requiring live loads and/or drop loads separately.

The freight lane attribute(s) can additionally and/or alternatively be or include geographic attributes. The geographic attributes can describe geographic information such as pickup location, dropoff location, route information, terrain information, route length or maximum radius from a route center, or other suitable geographic information. For instance, it may be desirable to avoid clusters that route carriers too far from a central point.

The freight lane attribute(s) can additionally and/or alternatively be or include weight attributes. The weight attributes can describe restrictions or characteristics of loads on the freight lane relating to weight, such as weight limits, average weight, or other suitable weight-related attributes. For instance, overweight loads on a given freight lane may prevent a carrier from signing up for a freight lane if they could not handle the weight of the overweight loads. Thus, it may be desirable to cluster freight lanes having overweight loads separately or uniquely compared to loads with standard (e.g., less than 45,000 lbs) weights.

The freight lane attribute(s) can additionally and/or alternatively be or include commodity type(s). Commodity types can be defined with any desirable degree of specificity, such as goods type, hazards or warnings, cleanliness, etc. As one example, certain commodities, such as oil, trash, pet food, tires, plastics, chemicals, raw materials, recycling, scrap, cardboard, batteries, automobile parts, etc. may be clustered separately from some other commodities, such as food-grade commodities, paper goods, finished goods, clothing, etc. that may be contaminated or spoiled by exposure to the first group of commodities. As another example, floor-loaded commodities such as bathroom fixtures, paper rolls, steel, used clothing, etc. may result in additional wait time for a carrier. As such, in some implementations, it may be desirable to cluster floor-loaded commodities together. As another example, in some implementations, it may be desirable to cluster some goods such as alcoholic beverages separately from non-alcoholic goods as alcoholic goods may require increased care for regulations, inspections, etc. than other goods.

The freight lane attribute(s) can additionally and/or alternatively be or include rate(s), such as average rate, maximum rate, minimum rate, median rate, and/or any other suitable rate(s) of loads on the freight lane. In some implementations, fixed rates for loads on a clustered freight lane may be determined based at least in part on lane attributes indicative of rates for loads on the freight lanes that are clustered to form the clustered freight lane. For instance, in some implementations, clustering two or more freight lanes to generate a clustered freight lane can include determining a rate associated with the clustered freight lane. The rate can be based at least in part on the one or more lane attributes associated with the two or more freight lanes. Rates may be cataloged from historical data of loads on the freight lanes, may be input based on contracts with carriers, and/or may be learned in any other suitable manner.

Additionally and/or alternatively, the system can determine that two or more freight lanes of the plurality of freight lanes satisfy at least one clustering criteria indicative of a similarity between the two or more freight lanes based at least in part on the one or more lane attributes. In some implementations, the at least one clustering criteria can include one or more of a load volume criteria, a freight lane radius criteria, a pickup radius criteria, a dropoff radius criteria, an equipment type criteria, an average mileage criteria, a weight criteria, a potential routes criteria, a potential commodities criteria, a pickup schedule criteria, a dropoff schedule criteria, an average rate criteria, a reservation criteria, a freight lane status criteria, or bid criteria.

For instance, the system can compare the one or more lane attributes of the two or more freight lanes to determine whether the two or more freight lanes are viable to be clustered into a single clustered freight lane. As one example, the system can process the lane attributes to determine whether there are any rule- or heuristics-based conflicts, indicated by the clustering criteria, between the lane attributes of the two or more freight lanes. As one example, if a first freight lane includes a lane attribute indicating that the first freight lane is performed using a food-grade trailer and a second freight lane includes a lane attribute indicating that loads on the second lane may contain potentially contaminating commodities, such as oil, chemicals, etc., the system can determine, based on the clustering criteria indicating that contaminating commodities should not be shipped with food-grade trailers, that the first freight lane and the second freight lane should not be clustered. As another example, if the first and second freight lanes have similar enough pickup and dropoff regions (e.g., as indicated by a radius-based comparison of the regions) and there are no conflicts in other lane attributes, the system may determine that the lanes could be clustered.

Additionally and/or alternatively, in some implementations, the clustering criteria can include a load volume criteria. For instance, the system can determine whether the available volume of loads on the freight lanes is inconsistent and/or low enough such that the clustered freight lane would provide improved consistency over the individual freight lanes. As one example, if the freight lanes are determined to have load volumes that are inconsistent enough and/or low enough such that the clustered freight lane would be beneficial, have sufficiently close pickup and dropoff locations, and are not determined to have any conflicts in other lane attributes (e.g., goods types that would contaminate a trailer or its contents, goods that require a specialized type of trailer or loading, etc.), then the freight lanes could be clustered into a clustered freight lane.

In response to determining that the two or more freight lanes meet the at least one clustering criteria, the system can cluster the two or more freight lanes to generate a clustered freight lane including the two or more freight lanes. If each of the plurality of freight lanes is associated with a customer, the clustered freight lane can be associated with one or more customers. For instance, while a customer may independently establish a lane for that customer, the clustered freight lane may include lanes from a plurality of customers without impacting the service provided to each of the plurality of customers. Clustering the two or more freight lanes to generate a clustered freight lane can include storing data descriptive of the clustered freight lane. The new clustered freight lane may be stored in place of the two or more freight lanes. Additionally and/or alternatively, the clustered freight lane may be represented as a list or other data structure indicative of which freight lanes are included in the cluster.

For instance, in one example, the clustered lane can be represented as a route between a pickup region and a dropoff region. Additionally and/or alternatively, the clustered lane can include a radius describing a region for inclusion in the clustered lane. For instance, newly-added freight lanes that fit within the radius and do not conflict with any clustering criteria may be added to an existing clustered lane. In this way, the clustered lane can improve management of lanes in the system. For instance, the data descriptive of the plurality of freight lanes and the clustered freight lane can be updated at regular intervals. The clustered freight lane can be updated as the data descriptive of the plurality of freight lanes is updated. For instance, the clustered lanes may be recomputed and/or the clusters may have new lanes added to them based on the radius.

In some implementations, clustering the two or more freight lanes to generate a clustered freight lane can include determining a geographical definition associated with the clustered freight lane. For instance, the geographical definition can be associated with at least one of a pickup region or a dropoff region associated with the clustered freight lane. As an example, in some implementations, if the pickup region of most or all of the two or more of the freight lanes is located within a particular geographic boundary, such as a city, state, etc., the geographic boundary may be associated with the clustered freight lane as its pickup location. Similarly, if the dropoff region of most or all of the two or more of the freight lanes is located within a particular geographic boundary, such as a city, state, etc., the geographic boundary may be associated with the clustered freight lane as its dropoff location. In some implementations, a name of the clustered freight lane can be determined based at least in part on the geographical definition. For instance, if the pickup region for a clustered lane is positioned within Los Angeles, California, and the dropoff region for the clustered lane is positioned within Dallas, Texas, the clustered freight lane may be referred to as a Los Angeles↔Dallas clustered freight lane.

In some implementations, clustering two or more freight lanes to generate a clustered freight lane can include determining a rate associated with the clustered freight lane. The rate can be based at least in part on the one or more lane attributes associated with the two or more freight lanes. For instance, the one or more lane attributes can describe rates associated with the two or more freight lanes, such as average rate, maximum rate, minimum rate, median rate, and/or any other suitable rate(s) of loads on the freight lane. The rate(s) for the clustered freight lane can be determined based at least in part on the rates associated with the two or more freight lanes. For instance, an average or weighted average of rates for the freight lanes included in the cluster may be used to determine the rates of loads on the cluster. In some implementations, determining a rate associated with the clustered freight lane can include determining a single rate associated with all loads in the clustered freight lane. For instance, each load on the clustered freight lane may offer the same rate. Additionally and/or alternatively, in some implementations, determining a rate associated with the clustered freight lane can include determining a base rate associated with the clustered freight lane, where rates associated with each load in the clustered freight lane are determined based at least in part on the base rate. For instance, loads may be adjusted from the base rate based on special requirements, distance, etc.

Additionally and/or alternatively, the system can receive, over one or more networks, a request from a carrier computing device to associate the carrier with the clustered freight lane. For instance, the carrier may have a carrier computing system associated with the carrier. The carrier computing system can be, for example, a user computing device such as a smartphone, tablet computer, laptop computer, a server computing system, a system onboard a carrier vehicle, and/or any other suitable computing system. The carrier computing system can communicate with a transport management system to exchange information for managing the carriers and/or freight lanes. For instance, the carrier computing system can receive (e.g., based on user input at one or more user input devices), signals indicative of user input from the carrier. The user input can describe the carrier's interactions with various elements of a user interface provided by the carrier computing system. For instance, the carrier can interact with the user interface at the carrier computing system such that the carrier computing system determines that the carrier should be associated with the clustered freight lane. For example, the carrier may be presented with a user interface element providing for the carrier to register with the clustered freight lane, such as a "register" button or similar element. Furthermore, in some implementations, the clustered freight lane may be recommended to the carrier based at least in part on a match between carrier preferences and lane attributes of the clustered freight lane.

In some implementations, the clustered freight lane is associated with a hierarchical priority ordering of a plurality of carriers. The hierarchical priority ordering can include at least one of a primary carrier or a secondary carrier. As used herein, a primary carrier or dedicated carrier refers to a carrier that is primarily responsible for loads on a given freight lane and/or clustered freight lane. For instance, a carrier may request to become a primary carrier on a freight lane. After becoming a primary carrier, the primary carrier may be assigned loads on the freight lane before other carriers have the opportunity to accept the loads. This can provide a regular source of work for the carrier in return for becoming a primary carrier. Additionally and/or alternatively, the primary carrier may be expected to accept a certain volume (e.g., percentage) of loads on the freight lane in return for continued status as a primary carrier. Generally, high-volume, consistent lanes attract primary carriers, and example aspects of the present disclosure can improve the odds of primary carriers dedicating their service to a clustered freight lane compared to the odds of a primary carrier registering on the freight lanes included in the clustered freight lane as separate lanes.

In some implementations, primary carriers can receive, at regular, semiregular, and/or sporadic intervals, feedback related to acceptance rate for a clustered lane that the primary carrier is assigned to. For instance, because the primary carriers may be required to meet certain acceptance volumes and/or percentages to maintain their statuses as primary carriers, it can be useful for the primary carriers to have access to metrics that score how satisfactory their acceptance rate is compared to the expectation for maintaining their status.

In addition to and/or alternatively to a primary carrier, one or more secondary carriers can be associated with a freight lane. A secondary carrier can be a carrier who is prepared to transport loads on the freight lane, but is not expected to carry loads with any degree of regularity or consistency. For instance, whereas a primary carrier may be required to accept a certain volume and/or percentage of loads on a freight lane to maintain status as a primary carrier, a secondary carrier may be able to accept as many or as few loads as desired without consequence. For lanes having both a primary carrier and/or one or more second carriers, the primary carrier can be assigned the at least one load prior to the secondary carrier(s). For lanes lacking a primary carrier, secondary carriers can be assigned the at least one load by any suitable manner, such as randomly, non-exclusively, with respect to preference matching, or by any other suitable manner. Furthermore, in some implementations, the hierarchical priority ordering can include an ordered or ranked plurality of secondary carriers, where secondary carriers that are higher in the ordered plurality receive a higher priority for accepting or rejecting loads. The ordered plurality can be ranked by expected rate, historical acceptance data associated with the carriers, and/or other suitable ordering.

The system can assign at least one load of the one or more loads associated with the two or more freight lanes including the clustered freight lane to the carrier based at least in part on the request from the carrier. For instance, once the carrier has been associated with the clustered freight lane, the system can assign loads from the clustered freight lane to the carrier. In some implementations, assigning the load to the carrier can include providing, from the system, a assigning communication to the carrier computing system. The assigning communication can inform the carrier computing system that the load has been assigned to the carrier.

In some implementations, loads can be assigned to carriers based at least in part on carrier preferences. For instance, in some implementations, assigning the at least one load can include receiving carrier preferences from the carrier associated with the clustered freight lane. In some implementations, the carrier preferences may be provided by the carrier when the carrier requests to be associated with the freight lane. For instance, when providing the request to be associated with the freight lane, the carrier may be provided with an interface element or other opportunity that provides for the carrier to input the carrier preferences. The carrier preferences can describe any preferences the carrier has regarding preferred load attributes of loads assigned to the carrier. As examples, the carrier preferences can be or can include, but are not limited to, pickup day, pickup time, dropoff day, dropoff time, lead time, maximum capacity, equipment type, loading type, geography, average load weight, commodity type, special requirements, customer type, or rate.

The system can determine that the load attributes of the at least one load satisfy at least some of the carrier preferences and, in response to determining that the load attributes of the at least one load satisfy at least some of the carrier preferences, assign the at least one load to the carrier. For instance, the system can score a compatibility between the load attributes of the at least one load and the carrier preferences and, based on the compatibility, determine whether to assign the at least one load to the carrier. For instance, if a carrier's preferences are completely or near-completely satisfied, the load may be assigned to the carrier. In some implementations, a complete match of carrier preferences may be required. In some other implementations, only a partial match of carrier preferences may be required for assigning. In some implementations, in response to determining that the load attributes of the at least one load satisfy at least some of the carrier preferences the load may be assigned exclusively. For instance, the load may be assigned and reserved (e.g., prevented from being subsequently assigned) until the carrier either accepts or rejects the assigned load. If the carrier is a primary carrier for the clustered lane and the carrier rejects the exclusively-assigned load, the carrier may additionally have the load counted against the percentage or volume that the carrier is expected to accept for the clustered lane.

Additionally and/or alternatively, the system can determine that the load attributes of the at least one load do not satisfy the carrier preferences. For instance, if a compatibility between the load attributes of the at least one load and the carrier preference is not satisfied (e.g., is below a satisfaction threshold) and/or if there is a heuristics- or rule-based conflict between attributes and preferences, the system may not exclusively assign the load to the carrier. In some implementations, in response to determining that the load attributes do not satisfy the carrier preferences, the system may not assign the load to the carrier. Additionally and/or alternatively, in some implementations, in response to determining that the load attributes do not satisfy the carrier preferences, the system may assign the load non-exclusively. For instance, a non-exclusively assigned load may be assigned to more than one carrier (e.g., secondary carriers and/or primary carriers) separately. Once a carrier accepts the assigned load, it may be rejected for other carriers.

In response to assigning the at least one load of the one or more loads to the carrier, the system can receive a tender acceptance response from the carrier accepting or rejecting the at least one load. For instance, the carrier computing system can receive the assigned load from the transport management system. The carrier computing system can then present the carrier with an interface that provides for the carrier to accept or reject the assigned load. For instance, the carrier may be presented with an interface detailing some or all load attributes associated with the load (e.g., pickup location, dropoff location, pickup day, rate, etc.) such that the carrier can make an informed decision about whether to accept the load. In some implementations, if the carrier fails to accept the load within a time duration (e.g., an hour, a day, etc.), the load may be automatically rejected.

Additionally and/or alternatively, in some implementations, assigning the at least one load of the one or more loads to the carrier can include automatically assigning the at least one load. Where the load is automatically assigned, the carrier is given an opportunity to reject the at least one load within a time duration and the at least one load is accepted otherwise. For instance, the carrier (e.g., a primary carrier) may be presumed to accept the load while still being provided with an opportunity to decline the load if the carrier does not seek to transport the load. The time duration can be any suitable duration (e.g., an hour, a day, etc.). In some implementations, the carrier may be provided with a toggle or setting that provides for the carrier to select between automatic assigning (e.g., for all lanes, for a particular lane or clustered lane, etc.) or accept/reject assignment. This approach can be beneficial if a carrier expects to carry a majority of loads on a given lane or clustered lane, such that the carrier does not have to dedicate time to reviewing loads before having them assigned. Additionally and/or alternatively, automatic assigning can reduce the risk of a carrier missing a load by failing to accept before the load is automatically rejected or timed-out.

The technology of the present disclosure can provide a number of benefits. For instance, the technology of the present disclosure can provide for improved efficiency in allocating freight lanes across carriers. As one example, the technology of the present disclosure can provide for freight lanes that would otherwise be undesirable to carriers due to attributes such as obscure requirements, low rate, low volume, or other reasons to be clustered with other freight lanes, such as desirable freight lanes or freight lanes that, if undesirable individually, may be more desirable when clustered. For instance, freight lanes can be more desirable to carriers if loads on the freight lane are more consistently available, have increased rates, have consistent loading and equipment requirements, and/or generally reduce the complexity on the carrier for transporting loads in the freight lane. As a motivating example, several freight lanes in a similar region having low or inconsistent load volume can be grouped into a single cluster which has improved consistency (e.g., a more consistent load volume) by incorporating loads from the several freight lanes. While carriers may not desire freight lanes with inconsistent load volume, the improved consistency can lead the cluster to be more desirable to carriers than the individual freight lanes. As another example, a first freight lane with inconsistent or low volume can be clustered with one or more second freight lanes having consistent volume, such that the inconsistency of the first freight lane is mitigated by inclusion in a cluster with the second freight lanes. In addition, because the freight lanes are clustered with respect to clustering criteria and lane attributes, the similarity of the clustered freight lanes can result in clustering without a detrimental impact to the carriers' experience.

In addition to and/or alternatively to the benefits of encouraging carriers to accept potentially undesirable freight lanes, the systems and methods according to example aspects of the present disclosure can improve the functionality of computing technology. For instance, the technology of the present disclosure can reduce the utilization of computing resources on actions associated with assigning or maintaining individual freight lanes. As one example, computing resource use dedicated to assigning multiple freight lanes can be consolidated into computing resources dedicated to assigning only a single cluster. As another example, computing resource usage associated with contracting for multiple freight lanes (e.g., communicating with carriers) can be reduced to contracting with only a single cluster. New freight lanes that match clustering criteria associated with an existing cluster can also be incorporated into that cluster without requiring additional contracting work. For instance, matching carriers to clustered freight lanes having a higher chance of acceptance than individual freight lanes can reduce computing resources devoted by the transportation management system to tasks such as reassigning the rejected freight lanes after rejection, assigning new freight lanes to the carrier, and/or managing a greater number of loads on freight lanes that are prone to rejection and/or spend a greater amount of time unfulfilled.

Additionally and/or alternatively, improved clustering of freight lanes based on lane attributes can reduce computing resource usage associated with routing loads along the freight lanes and/or fuel consumption for vehicles carrying the loads. For instance, in some cases, loads from different freight lanes may be clustered into a single clustered freight lane, which can improve efficiency of transport vehicles and/or improve utilization of carriers. Additionally and/or alternatively, computing resources associated with assigning multiple loads can be reduced by instead associated multiple loads with a single freight lane.

Referring now to FIGS. 1 through 6, example aspects of the present disclosure will be discussed in detail. It should be understood that various elements depicted in the Figures can be changed, modified, omitted, rearranged, or substituted without departing from the scope of the present disclosure.

FIG. 1 depicts a block diagram of an example system 100 for assigning loads to a carrier based at least in part on a clustered freight lane according to example embodiments of the present disclosure. The system 100 includes a transport management system 120. Transport management system 120 can provide various types of technological features for monitoring and tracking freight vehicles and performing other tasks related to the management of freight vehicles. For instance, transport management system 120 can assign or assign loads from customers to one or more carriers for delivery in return for a rate associated with the load.

Transport management system 120 can communicate with customer load interface 110. Customer load interface 110 can be associated with a customer. For example, a customer can create a profile or account associated with their loads and/or freight lanes. The customer can then input load data 112 to the customer load interface 110. The transport management system 120 can read load data 112 from the customer load interface to determine that the customer has added a new load to a freight lane. For instance, load data 112 can include load attributes such as an identifier of which lane the load is associated with, pickup time, dropoff time, equipment type, etc.

Transport management system 120 can include lane data 122 descriptive of a plurality of freight lanes. The lane data 122 can describe shipping patterns, such as regular or semi-regular shipping patterns, associated with a given customer. As one example, a freight lane may describe a semi-regular shipping pattern between a customer's manufacturing plant and distribution center, between the distribution center and distribution centers in other cities, or some other regularly-serviced route. The customer may regularly send shipments or loads between the distribution center and manufacturing plant (e.g., shipments of raw materials and/or finished goods) based on, for example, a manufacturing schedule, a certain volume of available goods, or other considerations. Example aspects of the present disclosure are discussed with reference to freight lanes having a pickup region and dropoff region for the purposes of illustration. It should be understood that freight lanes may have more than one pickup region and/or more than one dropoff region in accordance with example aspects of the present disclosure.

It should also be understood that freight lanes may not necessarily have consistent loads. Loads can be provided along the freight lane. For instance, the customer may provide loads that conform to the freight lane through customer load interface 110. Additionally and/or alternatively, the lane data 122 can include some or all lane attributes as described herein. For instance, the lane attributes can be stored as metadata for a lane of the lane data 122.

The transport management system 120 can additionally include carrier-lane association data 124. The carrier-lane association data 124 can describe associations between carriers and lanes. For instance, the carrier-lane association data 124 can describe, for a given carrier, which lane(s) the carrier is registered to receive loads for and/or whether, for each lane, the carrier is a primary carrier or secondary carrier. Additionally and/or alternatively, the carrier-lane association data 124 can describe, for a given lane (or clustered lane), which carrier(s) are registered to receive loads for and/or whether each carrier is a primary carrier or secondary carrier. In some implementations, the carrier-lane association data can be a list, table, or other tabulated data format for storing associations between carriers and lane(s).

The transport management system 120 can additionally include rate data 126. The rate data 126 can be descriptive of a carrier's rate for a given lane. According to example aspects of the present disclosure, a carrier can receive, for most or all loads, a fixed rate per load defined by a lane. Thus, in some implementations, the rate data 126 can include rates associated with lanes. Additionally and/or alternatively, in some implementations, the rate data 126 can include rates associated with particular loads.

The transport management system 120 can additionally include cluster data 128. Cluster data 128 can include data descriptive of one or more clustered freight lanes. For instance, after the clustered freight lanes are generated according to example aspects of the present disclosure, as discussed herein, the cluster data can store a representation of the clustered freight lanes. As one example, in some implementations, the cluster data 128 can include a pickup region and/or a dropoff region associated with a clustered freight lane. As another example, in some implementations, the cluster data 128 can include lane attributes associated with the clustered freight lane. As another example, in some implementations, the cluster data 128 can include data descriptive of which lanes (e.g., from lane data 122) are included in each clustered freight lane.

The transport management system 120 can additionally include carrier preferences data 130. The carrier preferences data 130 can be descriptive of carrier preferences associated with a carrier. As examples, the carrier preferences 130 can be or can include, but are not limited to, data descriptive of pickup day, pickup time, dropoff day, dropoff time, lead time, maximum capacity, equipment type, loading type, geography, average load weight, commodity type, special requirements, customer type, or rate.

The transport management system 120 can additionally include historical load data 132. The historical load data 132 can be descriptive of past loads on the transport management system 120. For instance, the historical load data 132 can include data such as lane attributes, past rates, timestamps associated with pickup/dropoff times, load frequency and/or volume over a given lane, and/or other data indicative of historical service associated with lanes. In some implementations, the historical load data 132 can be used in determining whether a lane is viable for clustering in a clustered freight lane. For example, lanes that historically demonstrate lower consistency and/or volume may be included in a clustered freight lane.

The transport management system 120 can communicate with one or more carrier computing systems 140. For instance, some or all carriers may have a carrier computing system 140 associated with the carrier. The carrier computing system 140 can be, for example, a user computing device such as a smartphone, tablet computer, laptop computer, a server computing system, a system onboard a carrier vehicle, and/or any other suitable computing system. The carrier computing system 140 can communicate with the transport management system 120 to exchange information for managing the carriers and/or freight lanes. For instance, the carrier computing system 140 can receive (e.g., based on user input at one or more user input devices 142), signals indicative of user input from the carrier. The user input can describe the carrier's interactions with various elements of a user interface 144 provided by the carrier computing system 140. For instance, the carrier can interact with the user interface 144 at the carrier computing system 140 such that the carrier computing system 140 determines that the carrier should be associated with the clustered freight lane. For example, the carrier may be presented with a user interface element providing for the carrier to register with the clustered freight lane, such as a "register" button or similar element. Furthermore, in some implementations, the clustered freight lane may be recommended to the carrier based at least in part on a match between carrier preferences and lane attributes of the clustered freight lane.

Figure 2:
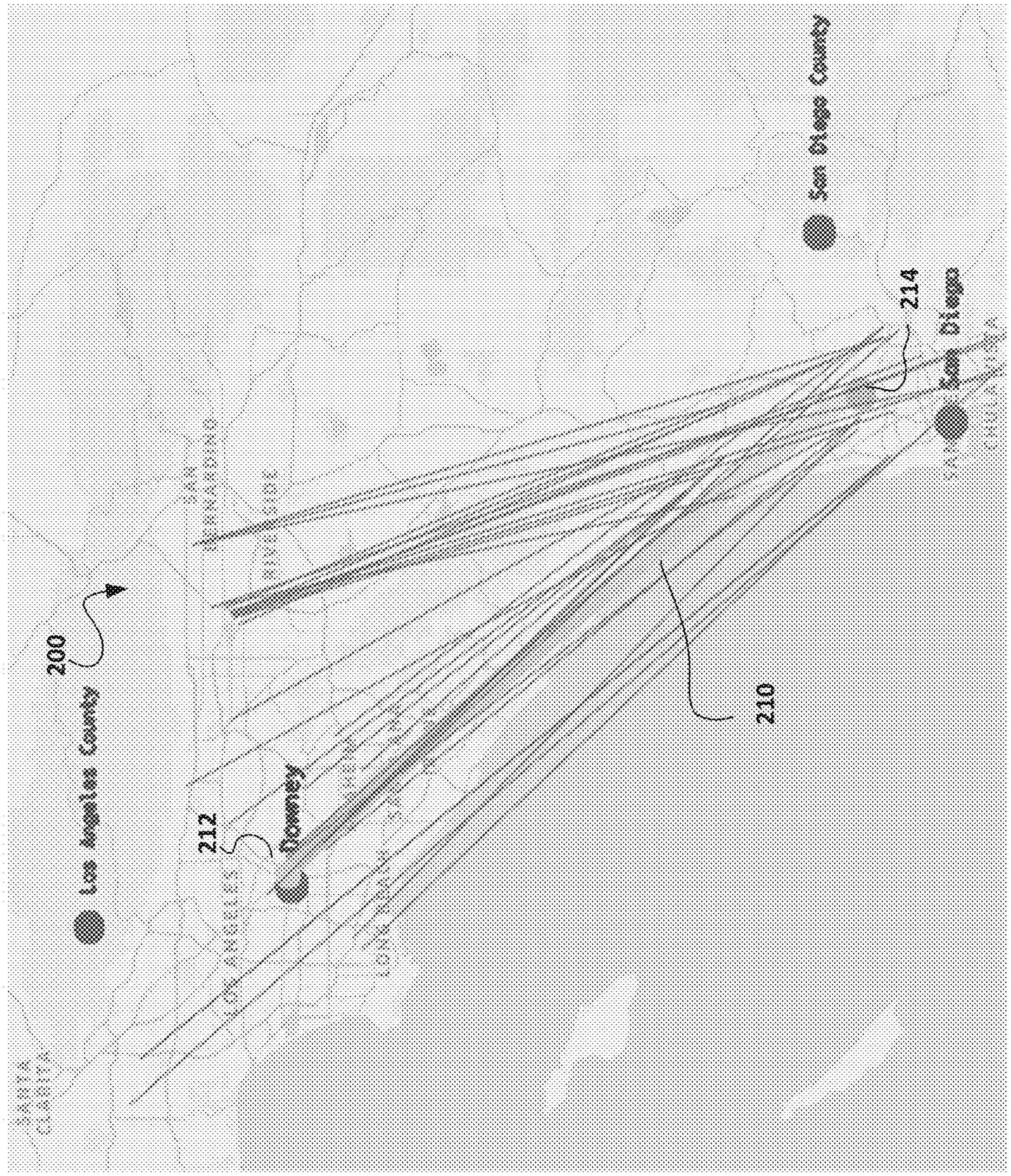
FIG. 2 depicts a map illustrating an example clustered freight lane according to example embodiments of the present disclosure.

FIG. 2 depicts a map 200 illustrating an example clustered freight lane according to example embodiments of the present disclosure. Map 200 depicts a plurality of freight lanes, represented by straight lines. As can be understood from map 200, many of the plurality of freight lanes have similar endpoints (e.g., pickup regions and/or dropoff regions). According to example aspects of the present disclosure, these freight lanes, especially those having low volume and/or low consistency, can be clustered to produce a clustered lane having greater volume and/or greater consistency. For instance, clustered lane 210 can be generated to encompass a plurality of freight lanes running from endpoint 212 (e.g., Downey) to endpoint 214 (e.g., North San Diego). The clustered lane 210 may be referred to based on geographic definitions associated with the endpoints 212, 214. In this way, loads can be provided along clustered lane 210 without requiring a carrier to contract for every freight lane included in the clustered lane 210.

Figure 3:
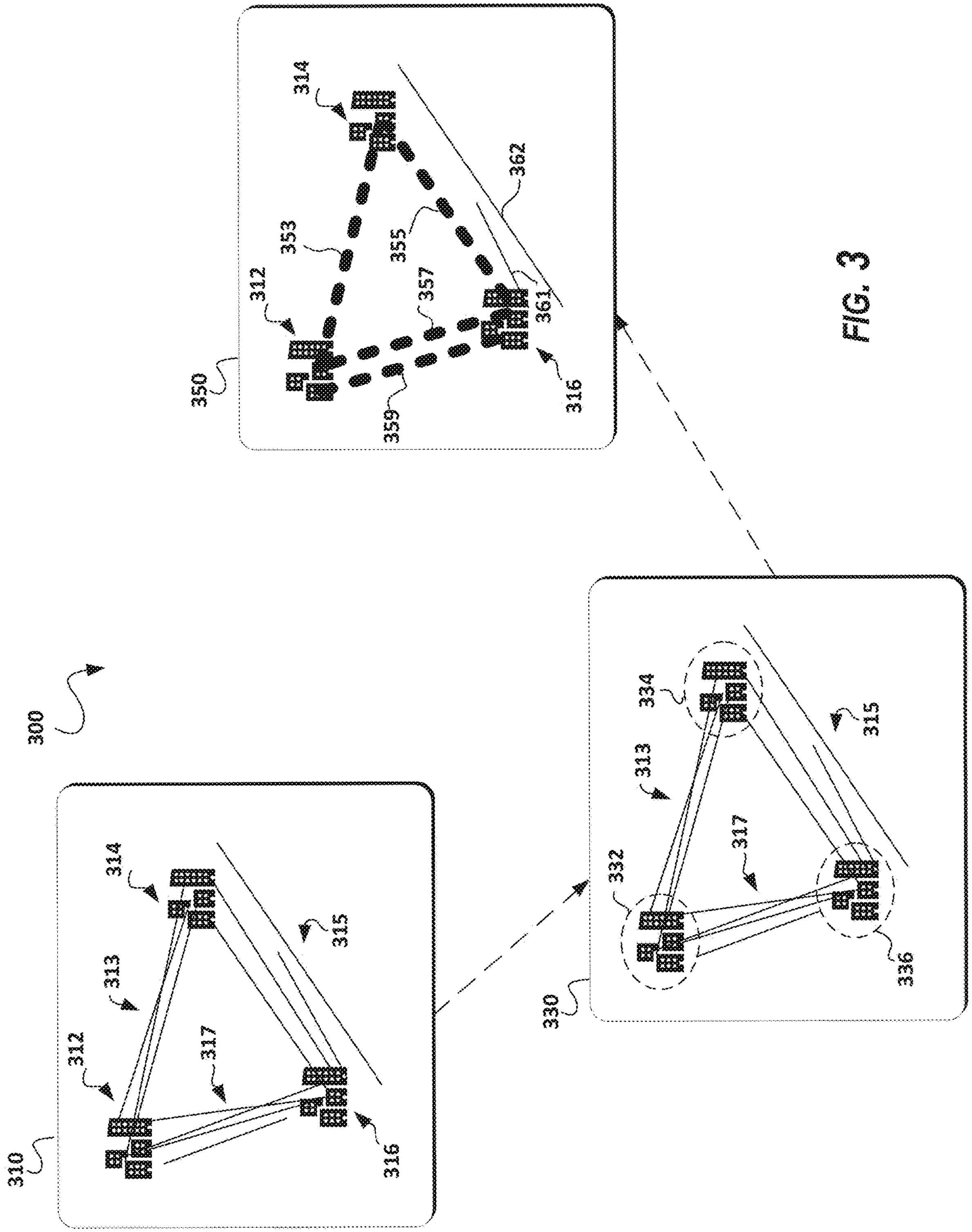
FIG. 3 depicts an example data flow diagram illustrating assigning loads to a carrier based at least in part on a clustered freight lane according to example embodiments of the present disclosure.

FIG. 3 depicts an example data flow diagram 300 illustrating assigning loads to a carrier based at least in part on a clustered freight lane according to example embodiments of the present disclosure. For instance, in first diagram 310, a system can store data descriptive of a plurality of freight lanes 313, 315, and 317. As depicted in FIG. 3, lanes 313 run between first region 312 and second region 314. Similarly, lanes 315 run between second region 314 and third region 316, and lanes 317 run between first region 312 and third region 316. Each of first region 312, second region 314, and/or third region 316 can be a district/suburb, city, county, state, or other geographic definition.

Second diagram 330 depicts that radii can be formed encompassing the endpoints of lanes 313, 315, and 317. For instance, a first radius 332 can encompass an area proximate first region 312. Similarly, second radius 334 can encompass an area proximate second region 314 and/or third radius 336 can encompass an area proximate third region 316. It should be understood that, while the radii 332, 334, 336 are depicted as being proximate particular regions, the radii may be determined in a process that is agnostic to existing geographic definitions, such as by an optimization algorithm optimizing for consistent volume. As illustrated, many of the endpoints of the lanes 313, 315, and 317 fall within the radii 332, 334, and 336.

Finally, third diagram 350 depicts the creation of clustered freight lanes 353, 355, 357, and 359 from the lanes 313, 315, and 317. As illustrated, lanes 313 running between first region 312 and second region 314 have been clustered into first clustered freight lane 353. Thus, each of lanes 313 can be effectively treated as a single lane, in that shipments from any of the lanes 313 can be provided to a carrier who is associated with the cluster 353. Similarly, lanes 315 have been clustered into clustered freight lane 355. Notably, not all of the lanes 315 have been included in clustered freight lane 355. For instance, lane 361, although having one endpoint within radius 336, does not have a second endpoint within radius 334. As such, it is not included in clustered freight lane 355. Similarly, although lane 362 is somewhat proximate the radii 334 and 336, it is not within the radii. As such, a carrier may have to go undesirably far from pickup regions of other lanes in the clustered freight lane 355 if lane 362 was included, and thus it is omitted. Finally, the lanes 317 have been clustered into two clustered freight lanes 357 and 359. This case can occur if the lane attributes of lanes 317 did not satisfy the clustering criteria. For instance, one of clustered freight lanes 357 or 359 may have some conflicting attribute(s) such as alcohol, contaminating materials, etc. such that it would be undesirable to cluster all of lanes 317 into a single clustered freight lane. For instance, if two or more lanes 317 have contaminating materials and two or more lanes 317 do not, it may be desirable to group the lanes 317 having contaminating materials into one clustered freight lane (e.g., 357), and those not having contaminating materials into a second clustered freight lane (e.g., 359). It should also be understood that lanes falling within the geographic boundaries of a clustered freight lane could still be excluded based on lane attribute conflicts, even if those lanes are not later grouped into another cluster.

Figure 4:
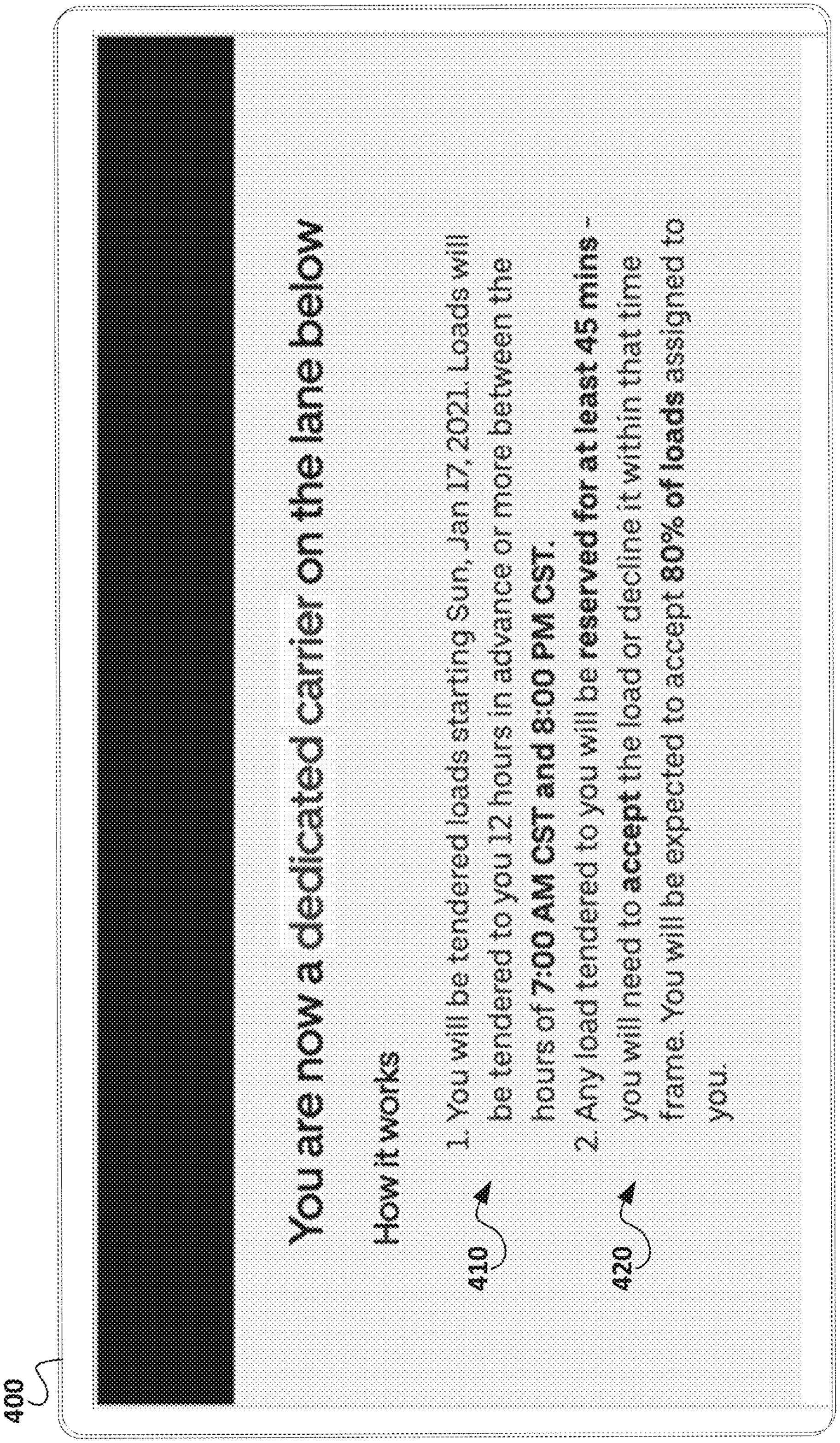
FIG. 4 depicts an example interface displaying assigning loads to a carrier based at least in part on a clustered freight lane according to example embodiments of the present disclosure.

FIG. 4 depicts an example interface 400 displaying assigning loads to a carrier based at least in part on a clustered freight lane according to example embodiments of the present disclosure. For instance, the interface 400 may be presented to a carrier after the carrier successfully registers as a primary carrier or dedicated carrier for a given lane, such as a clustered freight lane. The interface 400 can display information about the lane for the carrier's understanding. For instance, at element 410, the interface 400 details information about lane attributes such as pickup time window, days, timeslot, etc. Additionally, at element 420, the interface 400 communicates details about load assigning and expectations for primary carriers. For instance, the element 420 communicates that loads will be reserved for 45 minutes, during which the carrier is expected to accept or decline the load. The element 420 also communicates that the primary carrier is expected to accept eighty percent of assigned loads. It should be understood that these attributes and expectations are for the purposes of illustration only and are not intended to be limiting in any manner.

Figure 5:
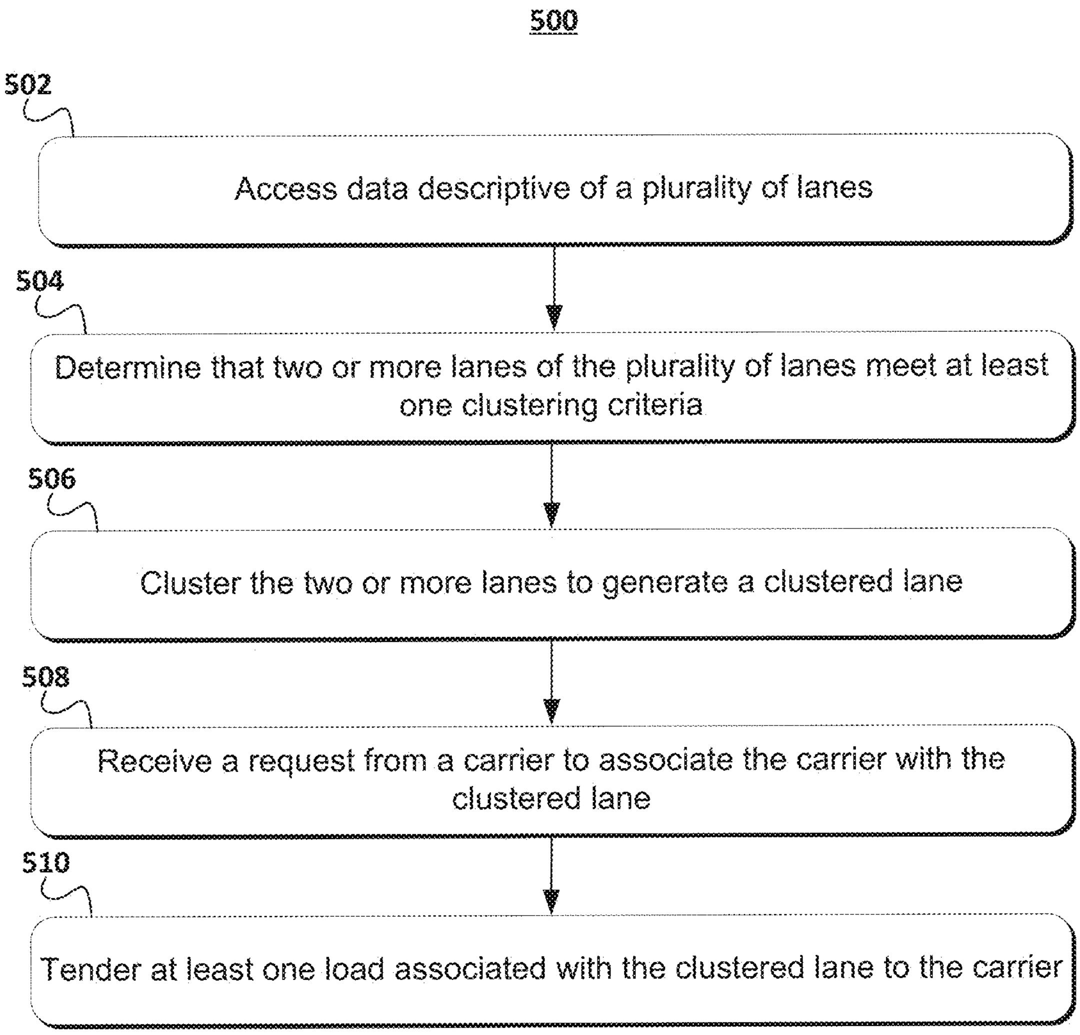
FIG. 5 depicts a flowchart diagram of an example method for assigning loads to a carrier based at least in part on a clustered freight lane according to example embodiments of the present disclosure.

FIG. 5 depicts a flowchart diagram of an example method 500 for assigning loads to a carrier based at least in part on a clustered freight lane according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices.

The method 500 can include, at 502, accessing data descriptive of a plurality of freight lanes, each freight lane being associated with a pickup region and a dropoff region for one or more loads. The freight lanes can describe shipping patterns, such as regular or semi-regular shipping patterns, associated with a given customer. As one example, a freight lane may describe a semi-regular shipping pattern between a customer's manufacturing plant and distribution center, between the distribution center and distribution centers in other cities, or some other regularly-serviced route. The customer may regularly send shipments or loads between the distribution center and manufacturing plant (e.g., shipments of raw materials and/or finished goods) based on, for example, a manufacturing schedule, a certain volume of available goods, or other considerations. Example aspects of the present disclosure are discussed with reference to freight lanes having a pickup region and dropoff region for the purposes of illustration. It should be understood that freight lanes may have more than one pickup region and/or more than one dropoff region in accordance with example aspects of the present disclosure. It should also be understood that freight lanes may not necessarily have consistent loads. Loads can be provided along the freight lane. For instance, the customer may provide loads that conform to the freight lane.

The pickup region can describe a specific and/or generalized geographic region in which a load associated with the freight lane is first acquired by the carrier who is assigned to ship the load. Additionally and/or alternatively, the dropoff region can describe a specific and/or generalized geographic region in which the load is removed from the carrier's possession and/or the load is completed. The pickup region and/or dropoff region can be described with various degrees of specificity. For instance, in some implementations, the pickup region and/or dropoff region may describe coordinates/addresses, coordinates/addresses with a generalized radius, neighborhoods or districts, suburbs, cities, greater city areas, counties, states, countries, etc., and/or combinations thereof. Generally, a carrier will acquire the load at the pickup region, transport (e.g., by a carrier vehicle, such as a truck) the load to the dropoff region, then deliver the load at the dropoff region to a second party, such as another carrier, a customer, a manufacturer or distributor, etc.

The freight lane(s) can have one or more lane attributes respectively associated with the freight lane(s). For instance, the system can store data descriptive of the freight lane attribute(s) respectively associated with the freight lane(s). The freight lane attribute(s) can be stored in a data structure with the freight lane(s). The freight lane attribute(s) can describe attributes of a freight lane including, but not limited to, geographic attributes, shipping limitations or requirements, commodity types, and/or any other suitable attributes. Clustering decisions described herein may be made based on some or all of the lane attributes described herein. However, the example lane attributes described herein are intended to be illustrative and not limiting, and variations on which, if any, lane attributes are considered, by heuristic rules or otherwise, are contemplated as being within the scope of the present disclosure.

As one example, the freight lane attribute(s) can be or can include equipment type. The equipment type attribute can describe a type of equipment that is recommended and/or required to transport loads along the freight lane. For instance, the equipment type attribute can indicate that the freight lane requires flatbed trailers, vans, reefers or refrigerated trailers, livestock trailers, automobile trailers, wide-load trucks and/or trailers, and/or any other suitable equipment type restrictions or recommendations. For instance, in some implementations, it may be desirable to cluster freight lanes requiring different types of equipment separately. The freight lane attribute(s) can additionally and/or alternatively be or include special requirements, such as plated trailers, vented trailers, driver assist, etc. that may complicate loads on the freight lane. The freight lane attribute(s) can additionally and/or alternatively be or include loading type. The loading type attribute can describe a loading type required for the freight lane. For instance, the loading type attribute can indicate whether a live load or drop load is required. In some implementations, it may be desirable to cluster freight lanes requiring live loads and/or drop loads separately.

The freight lane attribute(s) can additionally and/or alternatively be or include geographic attributes. The geographic attributes can describe geographic information such as pickup location, dropoff location, route information, terrain information, route length or maximum radius from a route center, or other suitable geographic information. For instance, it may be desirable to avoid clusters that route carriers too far from a central point.

The freight lane attribute(s) can additionally and/or alternatively be or include weight attributes. The weight attributes can describe restrictions or characteristics of loads on the freight lane relating to weight, such as weight limits, average weight, or other suitable weight-related attributes. For instance, overweight loads on a given freight lane may prevent a carrier from signing up for a freight lane if they could not handle the weight of the overweight loads. Thus, it may be desirable to cluster freight lanes having overweight loads separately or uniquely compared to loads with standard (e.g., less than 45,000 lbs) weights.

The freight lane attribute(s) can additionally and/or alternatively be or include commodity type(s). Commodity types can be defined with any desirable degree of specificity, such as goods type, hazards or warnings, cleanliness, etc. As one example, certain commodities, such as oil, trash, pet food, tires, plastics, chemicals, raw materials, recycling, scrap, cardboard, batteries, automobile parts, etc. may be clustered separately from some other commodities, such as food-grade commodities, paper goods, finished goods, clothing, etc. that may be contaminated or spoiled by exposure to the first group of commodities. As another example, floor-loaded commodities such as bathroom fixtures, paper rolls, steel, used clothing, etc. may result in additional wait time for a carrier. As such, in some implementations, it may be desirable to cluster floor-loaded commodities together. As another example, in some implementations, it may be desirable to cluster some goods such as alcoholic beverages separately from non-alcoholic goods as alcoholic goods may require increased care for regulations, inspections, etc. than other goods.

The freight lane attribute(s) can additionally and/or alternatively be or include rate(s), such as average rate, maximum rate, minimum rate, median rate, and/or any other suitable rate(s) of loads on the freight lane. In some implementations, fixed rates for loads on a clustered freight lane may be determined based at least in part on lane attributes indicative of rates for loads on the freight lanes that are clustered to form the clustered freight lane. For instance, in some implementations, clustering two or more freight lanes to generate a clustered freight lane can include determining a rate associated with the clustered freight lane. The rate can be based at least in part on the one or more lane attributes associated with the two or more freight lanes. Rates may be cataloged from historical data of loads on the freight lanes, may be input based on contracts with carriers, and/or may be learned in any other suitable manner.

The method 500 can include, at 504, determining that two or more freight lanes of the plurality of freight lanes satisfy at least one clustering criteria indicative of a similarity between the two or more freight lanes based at least in part on the one or more freight lane attributes of each of the two or more freight lanes. In some implementations, the at least one clustering criteria can include one or more of a load volume criteria, a freight lane radius criteria, a pickup radius criteria, a dropoff radius criteria, an equipment type criteria, an average mileage criteria, a weight criteria, a potential routes criteria, a potential commodities criteria, a pickup schedule criteria, a dropoff schedule criteria, an average rate criteria, a reservation criteria, a freight lane status criteria, or bid criteria.

For instance, the system can compare the one or more lane attributes of the two or more freight lanes to determine whether the two or more freight lanes are viable to be clustered into a single clustered freight lane. As one example, the system can process the lane attributes to determine whether there are any rule- or heuristics-based conflicts, indicated by the clustering criteria, between the lane attributes of the two or more freight lanes. As one example, if a first freight lane includes a lane attribute indicating that the first freight lane is performed using a food-grade trailer and a second freight lane includes a lane attribute indicating that loads on the second lane may contain potentially contaminating commodities, such as oil, chemicals, etc., the system can determine, based on the clustering criteria indicating that contaminating commodities should not be shipped with food-grade trailers, that the first freight lane and the second freight lane should not be clustered. As another example, if the first and second freight lanes have similar enough pickup and dropoff regions (e.g., as indicated by a radius-based comparison of the regions) and there are no conflicts in other lane attributes, the system may determine that the lanes could be clustered.

Additionally and/or alternatively, in some implementations, the clustering criteria can include a load volume criteria. For instance, the system can determine whether the available volume of loads on the freight lanes is inconsistent and/or low enough such that the clustered freight lane would provide improved consistency over the individual freight lanes. As one example, if the freight lanes are determined to have load volumes that are inconsistent enough and/or low enough such that the clustered freight lane would be beneficial, have sufficiently close pickup and dropoff locations, and are not determined to have any conflicts in other lane attributes (e.g., goods types that would contaminate a trailer or its contents, goods that require a specialized type of trailer or loading, etc.), then the freight lanes could be clustered into a clustered freight lane.

In response to determining that the two or more freight lanes meet the at least one clustering criteria, the method 500 can include, at 506, clustering the two or more freight lanes to generate a clustered freight lane including the two or more freight lanes. If each of the plurality of freight lanes is associated with a customer, the clustered freight lane can be associated with one or more customers. For instance, while a customer may independently establish a lane for that customer, the clustered freight lane may include lanes from a plurality of customers without impacting the service provided to each of the plurality of customers. Clustering the two or more freight lanes to generate a clustered freight lane can include storing data descriptive of the clustered freight lane. The new clustered freight lane may be stored in place of the two or more freight lanes. Additionally and/or alternatively, the clustered freight lane may be represented as a list or other data structure indicative of which freight lanes are included in the cluster.

For instance, in one example, the clustered lane can be represented as a route between a pickup region and a dropoff region. Additionally and/or alternatively, the clustered lane can include a radius describing a region for inclusion in the clustered lane. For instance, newly-added freight lanes that fit within the radius and do not conflict with any clustering criteria may be added to an existing clustered lane. In this way, the clustered lane can improve management of lanes in the system. For instance, the data descriptive of the plurality of freight lanes and the clustered freight lane can be updated at regular intervals. The clustered freight lane can be updated as the data descriptive of the plurality of freight lanes is updated. For instance, the clustered lanes may be recomputed and/or the clusters may have new lanes added to them based on the radius.

In some implementations, clustering the two or more freight lanes to generate a clustered freight lane can include determining a geographical definition associated with the clustered freight lane. For instance, the geographical definition can be associated with at least one of a pickup region or a dropoff region associated with the clustered freight lane. As an example, in some implementations, if the pickup region of most or all of the two or more of the freight lanes is located within a particular geographic boundary, such as a city, state, etc., the geographic boundary may be associated with the clustered freight lane as its pickup location. Similarly, if the dropoff region of most or all of the two or more of the freight lanes is located within a particular geographic boundary, such as a city, state, etc., the geographic boundary may be associated with the clustered freight lane as its dropoff location. In some implementations, a name of the clustered freight lane can be determined based at least in part on the geographical definition. For instance, if the pickup region for a clustered lane is positioned within Los Angeles, California, and the dropoff region for the clustered lane is positioned within Dallas, Texas, the clustered freight lane may be referred to as a Los Angeles↔Dallas clustered freight lane.

In some implementations, clustering two or more freight lanes to generate a clustered freight lane can include determining a rate associated with the clustered freight lane. The rate can be based at least in part on the one or more lane attributes associated with the two or more freight lanes. For instance, the one or more lane attributes can describe rates associated with the two or more freight lanes, such as average rate, maximum rate, minimum rate, median rate, and/or any other suitable rate(s) of loads on the freight lane. The rate(s) for the clustered freight lane can be determined based at least in part on the rates associated with the two or more freight lanes. For instance, an average or weighted average of rates for the freight lanes included in the cluster may be used to determine the rates of loads on the cluster. In some implementations, determining a rate associated with the clustered freight lane can include determining a single rate associated with all loads in the clustered freight lane. For instance, each load on the clustered freight lane may offer the same rate. Additionally and/or alternatively, in some implementations, determining a rate associated with the clustered freight lane can include determining a base rate associated with the clustered freight lane, where rates associated with each load in the clustered freight lane are determined based at least in part on the base rate. For instance, loads may be adjusted from the base rate based on special requirements, distance, etc.

The method 500 can include, at 508 receiving, over one or more networks, a request from a carrier computing device to associate the carrier with the clustered freight lane. For instance, the carrier may have a carrier computing system associated with the carrier. The carrier computing system can be, for example, a user computing device such as a smartphone, tablet computer, laptop computer, a server computing system, a system onboard a carrier vehicle, and/or any other suitable computing system. The carrier computing system can communicate with a transport management system to exchange information for managing the carriers and/or freight lanes. For instance, the carrier computing system can receive (e.g., based on user input at one or more user input devices), signals indicative of user input from the carrier. The user input can describe the carrier's interactions with various elements of a user interface provided by the carrier computing system. For instance, the carrier can interact with the user interface at the carrier computing system such that the carrier computing system determines that the carrier should be associated with the clustered freight lane. For example, the carrier may be presented with a user interface element providing for the carrier to register with the clustered freight lane, such as a "register" button or similar element. Furthermore, in some implementations, the clustered freight lane may be recommended to the carrier based at least in part on a match between carrier preferences and lane attributes of the clustered freight lane.

The method 500 can include, at 510, assigning at least one load of the one or more loads associated with the two or more freight lanes including the clustered freight lane to the carrier based at least in part on the request from the carrier. For instance, once the carrier has been associated with the clustered freight lane, the system can assign loads from the clustered freight lane to the carrier. In some implementations, assigning the load to the carrier can include providing, from the system, a assigning communication to the carrier computing system. The assigning communication can inform the carrier computing system that the load has been assigned to the carrier.

In some implementations, loads can be assigned to carriers based at least in part on carrier preferences. For instance, in some implementations, assigning the at least one load can include receiving carrier preferences from the carrier associated with the clustered freight lane. In some implementations, the carrier preferences may be provided by the carrier when the carrier requests to be associated with the freight lane. For instance, when providing the request to be associated with the freight lane, the carrier may be provided with an interface element or other opportunity that provides for the carrier to input the carrier preferences. The carrier preferences can describe any preferences the carrier has regarding preferred load attributes of loads assigned to the carrier. As examples, the carrier preferences can be or can include, but are not limited to, pickup day, pickup time, dropoff day, dropoff time, lead time, maximum capacity, equipment type, loading type, geography, average load weight, commodity type, special requirements, customer type, or rate.

The system can determine that the load attributes of the at least one load satisfy at least some of the carrier preferences and, in response to determining that the load attributes of the at least one load satisfy at least some of the carrier preferences, assign the at least one load to the carrier. For instance, the system can score a compatibility between the load attributes of the at least one load and the carrier preferences and, based on the compatibility, determine whether to assign the at least one load to the carrier. For instance, if a carrier's preferences are completely or near-completely satisfied, the load may be assigned to the carrier. In some implementations, a complete match of carrier preferences may be required. In some other implementations, only a partial match of carrier preferences may be required for assigning. In some implementations, in response to determining that the load attributes of the at least one load satisfy at least some of the carrier preferences the load may be assigned exclusively. For instance, the load may be assigned and reserved (e.g., prevented from being subsequently assigned) until the carrier either accepts or rejects the assigned load. If the carrier is a primary carrier for the clustered lane and the carrier rejects the exclusively-assigned load, the carrier may additionally have the load counted against the percentage or volume that the carrier is expected to accept for the clustered lane.

Additionally and/or alternatively, the system can determine that the load attributes of the at least one load do not satisfy the carrier preferences. For instance, if a compatibility between the load attributes of the at least one load and the carrier preference is not satisfied (e.g., is below a satisfaction threshold) and/or if there is a heuristics- or rule-based conflict between attributes and preferences, the system may not exclusively assign the load to the carrier. In some implementations, in response to determining that the load attributes do not satisfy the carrier preferences, the system may not assign the load to the carrier. Additionally and/or alternatively, in some implementations, in response to determining that the load attributes do not satisfy the carrier preferences, the system may assign the load non-exclusively. For instance, a non-exclusively assigned load may be assigned to more than one carrier (e.g., secondary carriers and/or primary carriers) separately. Once a carrier accepts the assigned load, it may be rejected for other carriers.

In response to assigning the at least one load of the one or more loads to the carrier, the system can receive a tender acceptance response from the carrier accepting or rejecting the at least one load. For instance, the carrier computing system can receive the assigned load from the transport management system. The carrier computing system can then present the carrier with an interface that provides for the carrier to accept or reject the assigned load. For instance, the carrier may be presented with an interface detailing some or all load attributes associated with the load (e.g., pickup location, dropoff location, pickup day, rate, etc.) such that the carrier can make an informed decision about whether to accept the load. In some implementations, if the carrier fails to accept the load within a time duration (e.g., an hour, a day, etc.), the load may be automatically rejected.

Additionally and/or alternatively, in some implementations, assigning the at least one load of the one or more loads to the carrier can include automatically assigning the at least one load. Where the load is automatically assigned, the carrier is given an opportunity to reject the at least one load within a time duration and the at least one load is accepted otherwise. For instance, the carrier (e.g., a primary carrier) may be presumed to accept the load while still being provided with an opportunity to decline the load if the carrier does not seek to transport the load. The time duration can be any suitable duration (e.g., an hour, a day, etc.). In some implementations, the carrier may be provided with a toggle or setting that provides for the carrier to select between automatic assigning (e.g., for all lanes, for a particular lane or clustered lane, etc.) or accept/reject assigning. This approach can be beneficial if a carrier expects to carry a majority of loads on a given lane or clustered lane, such that the carrier does not have to dedicate time to reviewing loads before having them assigned. Additionally and/or alternatively, automatic assigning can reduce the risk of a carrier missing a load by failing to accept before the load is automatically rejected or timed-out.

Figure 6:
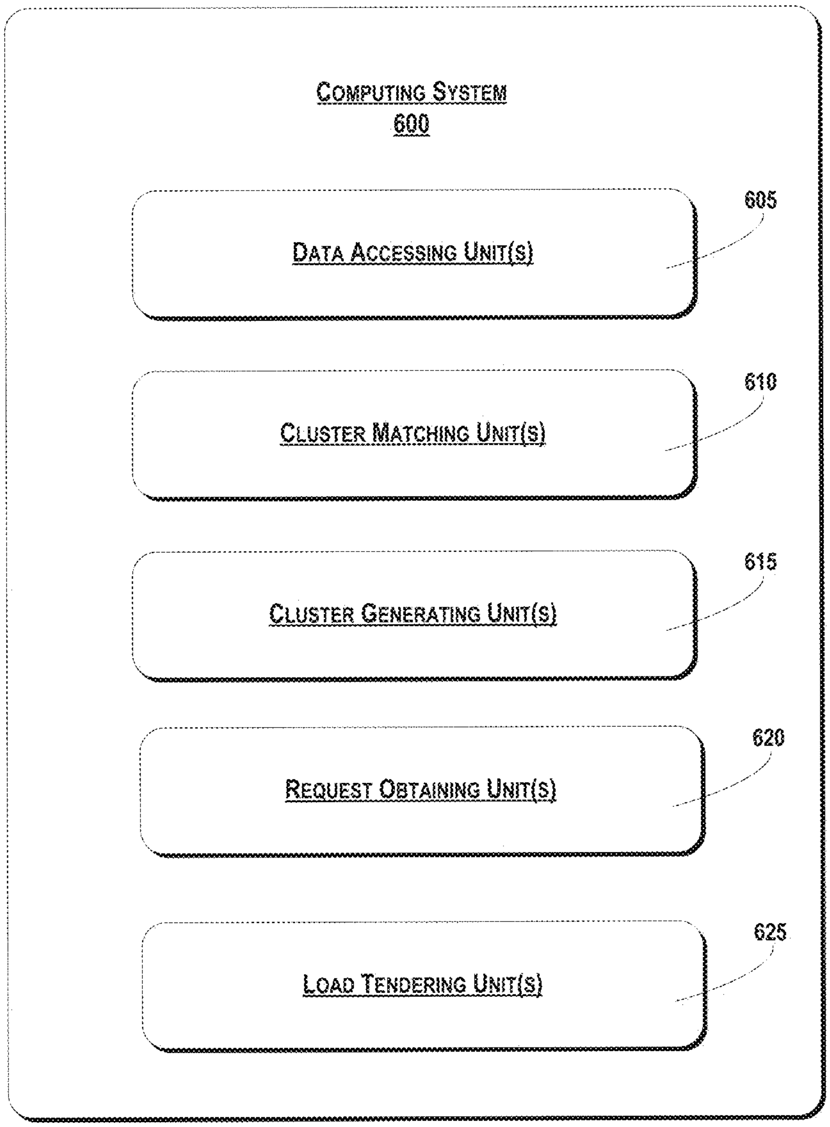
FIG. 6 depicts a block diagram of an example system for implementing systems and methods according to example embodiments of the present disclosure.

FIG. 6 depicts a block diagram of an example system 600 for implementing systems and methods according to example embodiments of the present disclosure. Various means can be configured to perform the methods and processes described herein. FIG. 6 depicts example units associated with a computing system for performing operations and functions according to example embodiments of the present disclosure. As depicted, FIG. 6 depicts a computing system 600 that can include, but is not limited to, data accessing unit(s) 605; cluster matching unit(s) 610; cluster generation unit(s) 615; request obtaining unit(s) 620; and/or load assigning unit(s) 625 In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor (s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device (s), data registrar(s), database(s), and/or other suitable hardware. The means can be programmed to perform one or more algorithm(s) for carrying out the operations and functions described herein.

The means can be configured to access data descriptive of a plurality of freight lanes, each freight lane being associated with a pickup region and a dropoff region for one or more loads, wherein each of the plurality of freight lanes includes one or more lane attributes. A data accessing unit 605 is one example of a means for accessing data descriptive of a plurality of freight lanes, each freight lane being associated with a pickup region and a dropoff region for one or more loads.

The means can be configured to determine that two or more freight lanes of the plurality of freight lanes satisfy at least one clustering criteria indicative of a similarity between the two or more freight lanes based at least in part on the one or more freight lane attributes of each of the two or more freight lanes. A cluster matching unit 610 is one example of a means for determining that two or more freight lanes of the plurality of freight lanes satisfy at least one clustering criteria The means can be configured to cluster the two or more freight lanes to generate a clustered freight lane including the two or more freight lanes. A cluster generating unit 615 is one example of a means for clustering the two or more freight lanes to generate a clustered freight lane including the two or more freight lanes.

The means can be configured to receive, over one or more networks, a request from a carrier computing device to associate the carrier with the clustered freight lane. A request obtaining unit 620 is one example of a means for receiving, over one or more networks, a request from a carrier computing device to associate the carrier with the clustered freight lane.

The means can be configured to assign at least one load of the one or more loads associated with the two or more freight lanes including the clustered freight lane to the carrier based at least in part on the request from the carrier. A load assigning unit 625 is one example of a means for assigning at least one load of the one or more loads associated with the two or more freight lanes including the clustered freight lane to the carrier.

Figure 7:
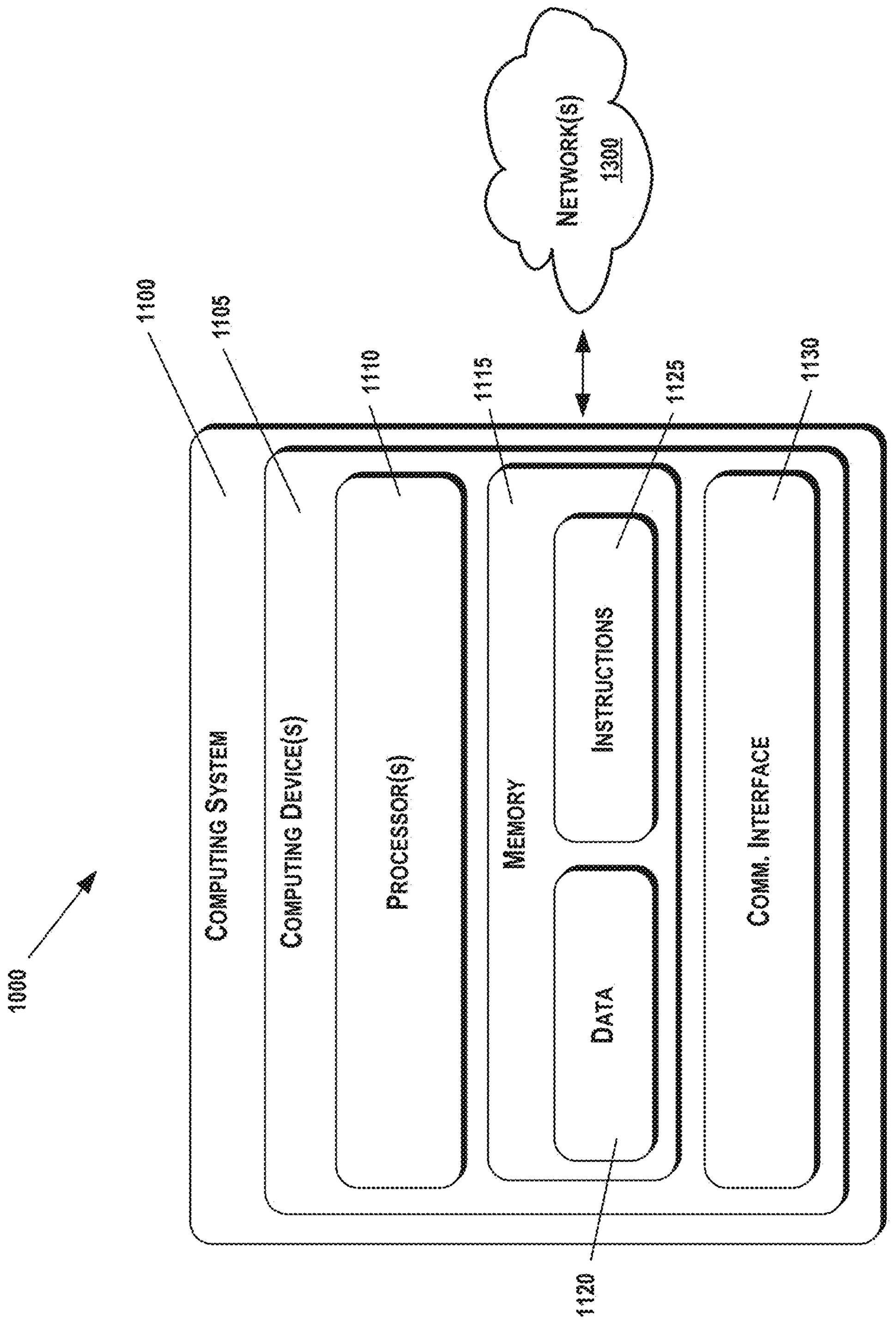
FIG. 7 depicts a block diagram of an example computing system according to example embodiments of the present disclosure.

FIG. 7 depicts a block diagram of an example computing system 1000 according to example embodiments of the present disclosure. The example system 1000 includes a computing system 1100 that can be communicatively coupled to one or more remote computing systems (not illustrated) over one or more networks 1300.

The computing system 1105 can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, and/or stored. The data 1120 can include, for instance, data such as load attributes, freight lanes, clustered freight lanes, etc. as described herein. In some implementations, the computing system 1100 can obtain data from one or more memory device(s) that are remote from the computing system 1100.

The memory 1115 can also store computer-readable instructions 1125 that can be executed by the one or more processors 1120. The instructions 1125 can be software written in any suitable programming language or can be implemented in hardware. Additionally, or alternatively, the instructions 1125 can be executed in logically and/or virtually separate threads on processor(s) 1110.

For example, the memory 1115 can store instructions 1125 that when executed by the one or more processors 1110 cause the one or more processors 1110 (the computing system) to perform any of the operations and/or functions described herein, including, for example, accessing data descriptive of a plurality of freight lanes, each freight lane being associated with a pickup region and a dropoff region for one or more loads, wherein each of the plurality of freight lanes includes one or more lane attributes; determining that two or more freight lanes of the plurality of freight lanes satisfy at least one clustering criteria indicative of a similarity between the two or more freight lanes based at least in part on the one or more freight lane attributes of each of the two or more freight lanes; in response to determining that the two or more freight lanes meet the at least one clustering criteria, clustering the two or more freight lanes to generate a clustered freight lane including the two or more freight lanes; receiving, over one or more networks, a request from a carrier computing device to associate a carrier with the clustered freight lane; and/or assigning at least one load of the one or more loads associated with the two or more freight lanes including the clustered freight lane to the carrier based at least in part on the request from the carrier.

The computing system 1100 can include a communication interface 1130. The communication interface 1130 can be used to communicate with one or more systems or devices, including systems or devices that are remotely located from the computing system 1100. A communication interface 1130 can include any circuits, components, software, etc. for communicating with one or more networks (e.g., 1300). In some implementations, a communication interface 1130 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 7 illustrates one example computing system 1000 that can be used to implement the present disclosure. Other computing systems can be used as well. In addition, components illustrated and/or discussed as being included in one of the computing systems 1100 can instead be included in any other suitable computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising:

one or more processors; and one or more non-transitory, computer-readable media storing instructions that are executable by the one or more processors to cause the computing system to perform operations, the operations comprising:

accessing one or more data structures comprising data descriptive of a plurality of freight lanes, each freight lane being associated with a pickup region and a dropoff region for one or more loads, wherein each of the plurality of freight lanes comprises one or more lane attributes;

based on determining that two or more freight lanes satisfy at least one clustering criteria, generating a clustered freight lane comprising the two or more freight lanes by generating an updated data structure indicating the two or more freight lanes within the clustered freight lane;

automatically assigning at least one load of the clustered freight lane to a first carrier based, at least in part, on the first carrier being associated as a primary carrier of the clustered freight lane, wherein automatically assigning the at least one load comprises automatically allocating at least a portion of future loads of the clustered freight lane to the first carrier such that the first carrier is automatically assigned at least the portion of the future loads from the clustered freight lane prior to another carrier being assigned the future loads;

determining that a threshold amount of time has passed and the at least one load has not been accepted by the first carrier;

responsive to determining that the at least one load has not been accepted by the first carrier, accessing a data structure to identify a second carrier associated as a secondary carrier for the clustered freight lane; and automatically assigning the at least one load of the clustered freight lane to the second carrier.

2. The computing system of claim 1, wherein automatically assigning the at least one load of the clustered freight lane to the second carrier is based, at least in part, on (i) the first carrier not accepting the at least one load and (ii) the second carrier being the secondary carrier of the clustered freight lane.

3. The computing system of claim 1, the operations comprising:

outputting, for rendering via a carrier computing device, data indicating the first carrier as the primary carrier for the clustered freight lane and the portion of the future loads allocated to the first carrier.

4. The computing system of claim 1, wherein each of the plurality of freight lanes is associated with a customer and wherein the clustered freight lane is associated with one or more customers.

5. The computing system of claim 1, wherein the clustered freight lane is associated with a hierarchical priority ordering of a plurality of carriers comprising the first carrier and the second carrier.

6. The computing system of claim 1, wherein clustering the two or more freight lanes to generate a clustered freight lane comprises determining a geographical definition associated with the clustered freight lane, the geographical definition associated with at least one of a pickup region or a dropoff region associated with the clustered freight lane.

7. The computing system of claim 1, wherein clustering the two or more freight lanes to generate a clustered freight lane comprises determining a rate associated with the clustered freight lane, wherein the rate is based at least in part on the one or more lane attributes associated with the two or more freight lanes.

8. The computing system of claim 7, wherein determining a rate associated with the clustered freight lane comprises determining a single rate associated with all loads in the clustered freight lane.

9. The computing system of claim 7, wherein determining a rate associated with the clustered freight lane comprises determining a base rate associated with the clustered freight lane, and wherein rates associated with each load in the clustered freight lane are determined based at least in part on the base rate.

10. The computing system of claim 1, wherein the one or more lane attributes comprise one or more of equipment type, loading type, geography, load weight, commodity type, special requirements, customer type, or rate.

11. The computing system of claim 1, wherein the data descriptive of the plurality of freight lanes and the clustered freight lane are updated at regular intervals.

12. A computer-implemented method, comprising:

accessing one or more data structures comprising data descriptive of a plurality of freight lanes, each freight lane being associated with a pickup region and a dropoff region for one or more loads, wherein each of the plurality of freight lanes comprises one or more lane attributes;

based on determining that two or more freight lanes satisfy at least one clustering criteria, generating a clustered freight lane comprising the two or more freight lanes by generating an updated data structure indicating the two or more freight lanes within the clustered freight lane;

automatically assigning at least one load of the clustered freight lane to a first carrier based, at least in part, on the first carrier being associated as a primary carrier of the clustered freight lane, wherein automatically assigning the at least one load comprises automatically allocating at least a portion of future loads of the clustered freight lane to the first carrier such that the first carrier is automatically assigned at least the portion of the future loads from the clustered freight lane prior to another carrier being assigned the future loads;

determining that a threshold amount of time has passed and the at least one load has not been accepted by the first carrier;

responsive to determining that the at least one load has not been accepted by the first carrier, accessing a data structure to identify a second carrier associated as a secondary carrier for the clustered freight lane; and automatically assigning the at least one load of the clustered freight lane to the second carrier.

13. The computer-implemented method of claim 12, wherein automatically assigning the at least one load of the clustered freight lane to the second carrier is based, at least in part, on (i) the first carrier not accepting the at least one load and (ii) the second carrier being the secondary carrier of the clustered freight lane.

14. The computer-implemented method of claim 12, comprising:

outputting, for rendering via a carrier computing device, data indicating the first carrier as the primary carrier for the clustered freight lane and the portion of the future loads allocated to the first carrier.

15. The computer-implemented method of claim 12, wherein the at least one clustering criteria comprises one or more of a load volume criteria, a freight lane radius criteria, a pickup radius criteria, a dropoff radius criteria, an equipment type criteria, an average mileage criteria, a weight criteria, a potential routes criteria, a potential commodities criteria, a pickup schedule criteria, a dropoff schedule criteria, an average rate criteria, a reservation criteria, a freight lane status criteria, or bid criteria.

16. The computer-implemented method of claim 12, wherein the clustered freight lane is associated with a hierarchical priority ordering of a plurality of carriers comprising the first carrier and the second carrier.

17. The computer-implemented method of claim 12, wherein the one or more lane attributes comprise one or more of equipment type, loading type, geography, load weight, commodity type, special requirements, customer type, or rate.

18. The computer-implemented method of claim 12, wherein assigning the at least one load comprises:

receiving carrier preferences from the second carrier associated with the clustered freight lane;

determining that load attributes of the at least one load satisfy at least some of the carrier preferences; and in response to determining that the load attributes of the at least one load satisfy at least some of the carrier preferences, assigning the at least one load to the second carrier.

19. The computer-implemented method of claim 18, wherein the carrier preferences comprise one or more of pickup day, pickup time, dropoff day, dropoff time, lead time, maximum capacity, equipment type, loading type, geography, average load weight, commodity type, special requirements, customer type, or rate.

20. One or more non-transitory computer readable media storing instructions that are executable by one or more processors to perform operations comprising:

accessing one or more data structures comprising data descriptive of a plurality of freight lanes, each freight lane being associated with a pickup region and a dropoff region for one or more loads, wherein each of the plurality of freight lanes comprises one or more lane attributes;

based on determining that two or more freight lanes satisfy at least one clustering criteria, generating a clustered freight lane comprising the two or more freight lanes by generating an updated data structure indicating the two or more freight lanes within the clustered freight lane;

automatically assigning at least one load of the clustered freight lane to a first carrier based, at least in part, on the first carrier being associated as a primary carrier of the clustered freight lane, wherein automatically assigning the at least one load comprises automatically allocating at least a portion of future loads of the clustered freight lane to the first carrier such that the first carrier is automatically assigned at least the portion of the future loads from the clustered freight lane prior to another carrier being assigned the future loads;

determining that a threshold amount of time has passed and the at least one load has not been accepted by the first carrier;

responsive to determining that the at least one load has not been accepted by the first carrier, accessing a data structure to identify a second carrier associated as a secondary carrier for the clustered freight lane; and automatically assigning the at least one load of the clustered freight lane to the second carrier.

* * * * *